Figure 1:
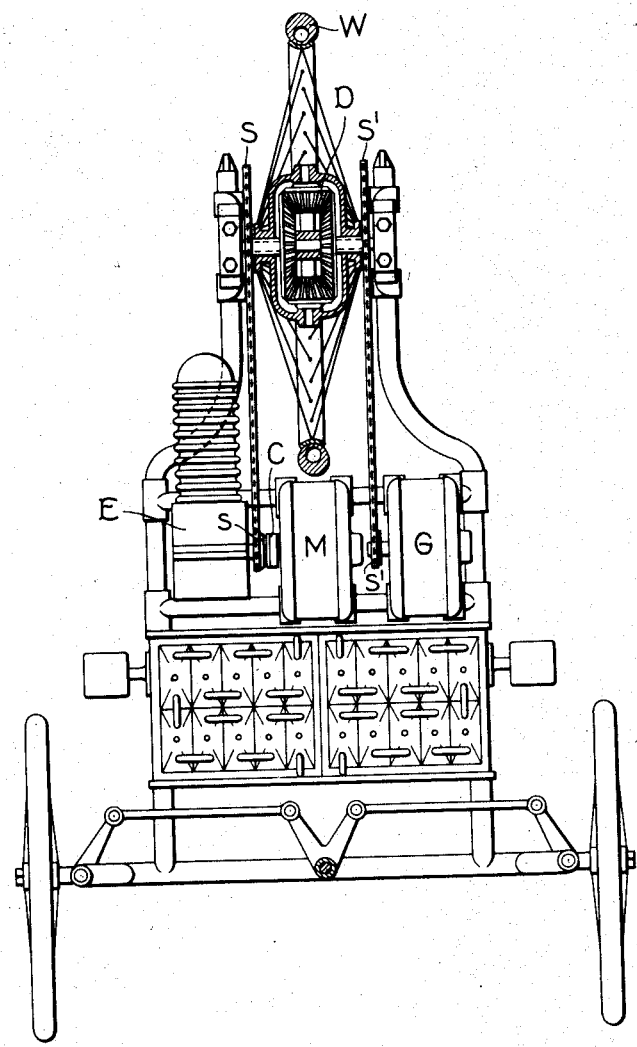

No. 812,573. PATENTED FEB. 13, 1906.
H. LEMP.
AUTOMOBILE.
APPLICATION FILED JUNE 9, 1904.

2 SHEETS—SHEET 2.

Witnesses.
Harry H. Tilden
Helen Orford

Inventor.
Hermann Lemp.
by Albert G. Davis
Att'y.

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

AUTOMOBILE.

No. 812,573.       Specification of Letters Patent.       Patented Feb. 13, 1906.

Application filed June 9, 1904. Serial No. 211,731.

*To all whom it may concern:*

Be it known that I, HERMANN LEMP, a citizen of the United States, residing at Lynn, county of Essex, State of Massachusetts, have invented certain new and useful Improvements in Automobiles, of which the following is a specification.

My invention relates to automobiles, and has particular reference to the driving mechanism for automobiles of the type described in Patent No. 723,168, issued to me March 17, 1903. In that patent I disclosed a driving mechanism for automobiles comprising a prime mover connected to one member of a differential gear. The driving-wheels of the vehicle are connected to a second member of the gear. A dynamo-electric machine or generator is connected to the third member of the gear. By closing the generator-circuit an electric current is produced which causes the generator to act as a clutch impressing torque upon the third member of the differential, and thereby upon the driving-wheels of the vehicle. By varying the amount of this current the speed and torque of the vehicle may be varied. Furthermore, by connecting a second dynamo-electric machine to the prime mover and placing it in circuit with the generator the current produced in the generator may be utilized to drive the second machine as a motor, thereby increasing the torque delivered by the prime mover to the first member of the differential gear instead of wasting the energy developed in the generator by dissipating it as heat in resistances. By varying the relative field strength of the generator and motor a wide range of speed and torque for the vehicle may be obtained, and by reversing the generator-field for high speeds the functions of the two machines are reversed, the generator becoming a motor and the motor a generator. The operation as thus far described is fully set forth in the patent above mentioned. When an internal-combustion engine is used for the prime mover, it is generally necessary to start the engine either by hand or from some outside source, and with the arrangement shown in my former patent it is necessary to drive the differential gears in starting the engine. Furthermore, since the differential gear is running when the engine is running, more or less noise is produced while the vehicle itself is at rest.

The object of my invention is to provide an improved arrangement of the transmitting mechanism of my former patent which shall enable the prime mover to be started free from the friction of the differential gears and which shall enable the gears to be at rest whenever the vehicle itself is at rest, which, furthermore, shall accomplish these results without the complication of an added pedal or lever. To secure these results, I provide a magnetic clutch inserted between the prime mover and the differential gear and I connect the energizing-winding of the clutch in circuit with the dynamo-electric machines. Thus at starting, when the circuit of the machines is open, the clutch is deënergized, and the engine may be started free from the friction of the gears. When the engine is up to speed and the circuit of the machines is closed, in order to start the vehicle the clutch is automatically energized and connects the prime mover mechanically to one member of the differential gear. Whenever the electric circuit is broken on stopping the vehicle, this connection is broken, and the gears may remain at rest as long as the vehicle itself is at rest.

My invention will best be understood by reference to the accompanying drawings, in which—

Figure 2:
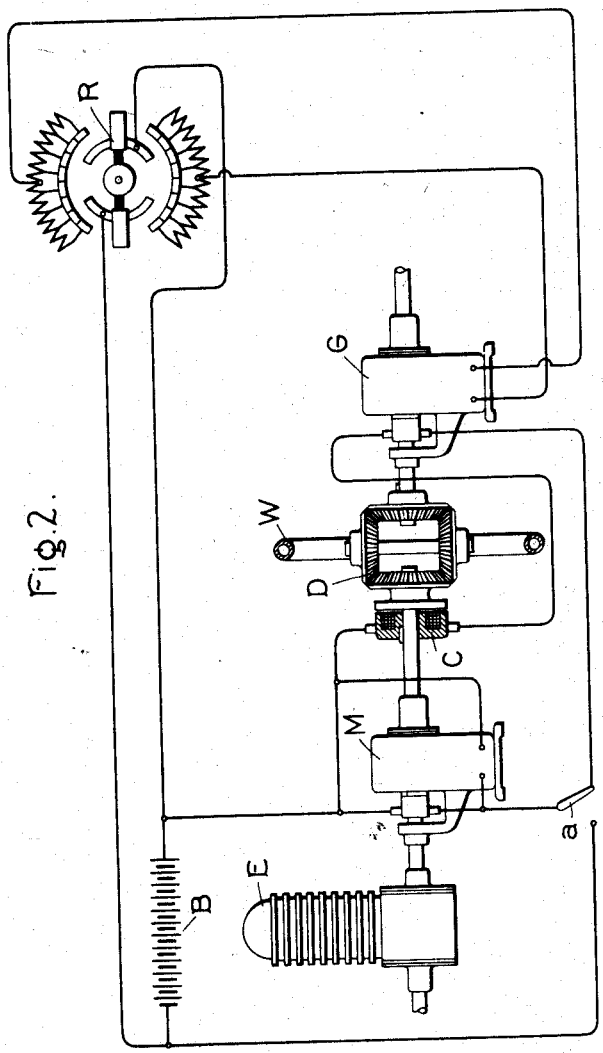

Figure 1 is a plan view of the driving mechanism for an automobile arranged in accordance with my invention, and Fig. 2 shows diagrammatically the circuit connections of the same.

Referring first to Fig. 1, E represents a suitable prime mover, such as an internal-combustion engine, carrying on its shaft the armature of a dynamo-electric machine M. Keyed to the engine-shaft is one member of magnetic clutch C. The other member of clutch C, which rides loosely on the shaft, carries a sprocket-wheel *s*, which is connected by a sprocket-chain to the sprocket-wheel S, which drives one member of the differential gear D. G is a second dynamo-electric machine or generator which carries on its shaft a sprocket-wheel *s'*, connected by a sprocket-chain to the sprocket-wheel S', which is connected to a second member of differential gear D and driven thereby. The third member of the differential gear D is connected to the driving-wheel W of the vehicle. The arrangement here described, with the exception of clutch C, is the same as that shown in Patent No. 723,168, above referred to.

Referring now to Fig. 2, I have shown for the sake of simplicity the several parts of the mechanism connected directly to the respective members of the differential gear, the sprocket-chains being omitted. It will be seen by varying the current through generator G the torque impressed upon the driving-wheel W may be varied and that the current in generator G, which produces the torque, may be utilized in the motor M for increasing the torque delivered by the engine E. B represents a battery which may be used to excite the field of generator G through the regulating-switch R, by means of which the field strength of the generator may be varied, as well as the direction of current through its field, whereby the generator may be caused to act as a motor for high speeds of the vehicle, as has been heretofore mentioned. $a$ is a switch arranged to connect the motor M either to the battery B for starting the engine or to the generator G for operation of the vehicle, so as to close the generator-circuit and transmit the current developed in the generator G to the motor M to be there transformed into torque to be added to the engine. With the switch $a$ in the position shown, connecting motor M in series with generator G, it will be seen that the circuit of the energizing-winding of clutch C is closed, since this energizing-winding is inserted in circuit between the two machines. The clutch is consequently energized, locking the engine-shaft to one member of the differential gear D. When switch $a$ is moved from this position, opening the circuit of the dynamo-electric machine, the clutch C is deënergized, disconnecting the engine-shaft from the differential gear. The engine E may then be started by hand or by throwing switch $a$ to its other position, connecting the motor M to the battery B. The engine starts entirely free from the friction load of the differential gear. Similarly whenever the electric circuit is broken in order to stop the vehicle the differential gear D is allowed to come to rest, thus preventing the noise which would result if the differential were always running.

In the drawings I have shown the generator G as separately excited and the motor M as shunt-wound, this being one of the arrangements shown in my former patent. It is obvious, however, that other arrangements may be used, if desired. Both machines may be series-wound, for instance, and the battery B may be omitted.

Other modifications may be made without departing from the spirit of my invention, and I desire in the appended claims to cover all such modifications.

What I claim as new, and desire to secure by Letters Patent of the United States, is—

1. In combination, a prime mover, a differential gear, a dynamo-electric machine connected thereto through said gear, and a magnetic clutch in circuit with said machine and adapted to clutch said prime mover to said gear.

2. In combination, a prime mover, differential gearing connecting said prime mover to the load, dynamo-electric machines controlling said gearing, and a magnetic clutch in circuit with said machines and arranged when deënergized to disconnect said prime mover from said gearing.

3. In combination, a differential gear, a prime mover connected to one member thereof, a dynamo-electric machine connected to a second member thereof, a second dynamo-electric machine connected to said prime mover, and a magnetic clutch in circuit with said machines and arranged when deënergized to disconnect said prime mover from said differential gear.

4. In combination, a differential gear, a prime mover connected to one member thereof, a dynamo-electric machine connected to a second member thereof, a second dynamo-electric machine connected to the prime mover, and in circuit with the first machine, means for varying the relative field strengths of said machines, and a magnetic clutch in circuit with said machines and arranged when deënergized to disconnect said prime mover from said differential gear.

5. In a self-propelled vehicle, a differential gear, a driving-wheel of the vehicle connected to one member of said gear, a prime mover connected to a second member of said gear, a dynamo-electric machine connected to the third member of said gear, a second dynamo-electric machine connected to said prime mover, and a magnetic clutch in circuit with said machines and arranged when deënergized to disconnect said prime mover from said gear.

6. In combination, an internal-combustion engine, a vehicle to be driven thereby, electrically-controlled speed-changing gearing between said engine and the driving-wheels of said vehicle, and means for disconnecting said engine from said gearing at starting and for automatically connecting said engine to said gearing when the controlling-circuit of said gearing is closed after the engine is started.

7. In combination, an internal-combustion engine, a vehicle to be driven thereby, speed-changing gearing between said engine and the driving-wheels of said vehicle, dynamo-electric machines controlling said gearing, and a magnetic clutch in circuit with said machines and arranged when deënergized to disconnect said engine from said gearing.

In witness whereof I have hereunto set my hand this 7th day of June, 1904.

HERMANN LEMP.

Witnesses:
 DUGALD McK. McKILLOP,
 CLARENCE E. CHURCHILL.